United States Patent
Wadas

(10) Patent No.: US 6,185,494 B1
(45) Date of Patent: *Feb. 6, 2001

(54) START-FROM-STOP ENGINE TORQUE LIMITING

(75) Inventor: David L. Wadas, Kalamazoo, MI (US)

(73) Assignee: Eaton Corporation, Cleveland, OH (US)

(*) Notice: Under 35 U.S.C. 154(b), the term of this patent shall be extended for 0 days.

This patent is subject to a terminal disclaimer.

(21) Appl. No.: 09/100,711

(22) Filed: Jun. 19, 1998

(51) Int. Cl.[7] ........................................... G06F 7/00
(52) U.S. Cl. ........................... 701/51; 701/53; 701/54; 701/61; 701/84; 477/115
(58) Field of Search ................. 701/51, 52, 53, 701/55, 56, 61, 84, 54; 477/111, 109, 123, 78, 115, 116; 74/336 R, 335, 745, 331

(56) References Cited

U.S. PATENT DOCUMENTS

| | | | |
|---|---|---|---|
| 4,754,665 | 7/1988 | Vandervoort | 74/745 |
| 4,920,815 | 5/1990 | Reynolds | 74/335 |
| 4,974,468 | 12/1990 | Reynolds et al. | 74/473.19 |
| 5,000,060 | 3/1991 | Reynolds et al. | 74/745 |
| 5,222,404 | 6/1993 | Stine | 74/335 |
| 5,370,013 | 12/1994 | Reynolds et al. | 74/330 |
| 5,390,561 | 2/1995 | Stine | 74/331 |
| 5,582,558 | 12/1996 | Palmeri et al. | 477/109 |
| 5,651,292 | 7/1997 | Genise | 74/745 |
| 5,673,592 | * 10/1997 | Huggins et al. | 74/336 R |
| 5,797,110 | * 8/1998 | Braun et al. | 701/84 |
| 5,894,758 | * 4/1999 | Walker | 74/335 |
| 5,904,635 | * 5/1999 | Genise et al. | 477/111 |

* cited by examiner

Primary Examiner—Jacques H. Louis-Jacques
(74) Attorney, Agent, or Firm—Howard D. Gordon

(57) ABSTRACT

A control for preventing damage to a vehicular driveline (10) during attempts to launch a vehicle from a stopped condition while engaged in an inappropriate start ratio. The control involves sensing engaged transmission ratio (GR) and vehicle speed (OS) to determine if the vehicle is being launched while the transmission is engaged in an inappropriate start ratio and, if such conditions are sensed, issuing command signals to the engine controller (36) to cause engine output torque to be limited to a predetermined value, preferably a value less than 50% of maximum engine output torque.

21 Claims, 6 Drawing Sheets

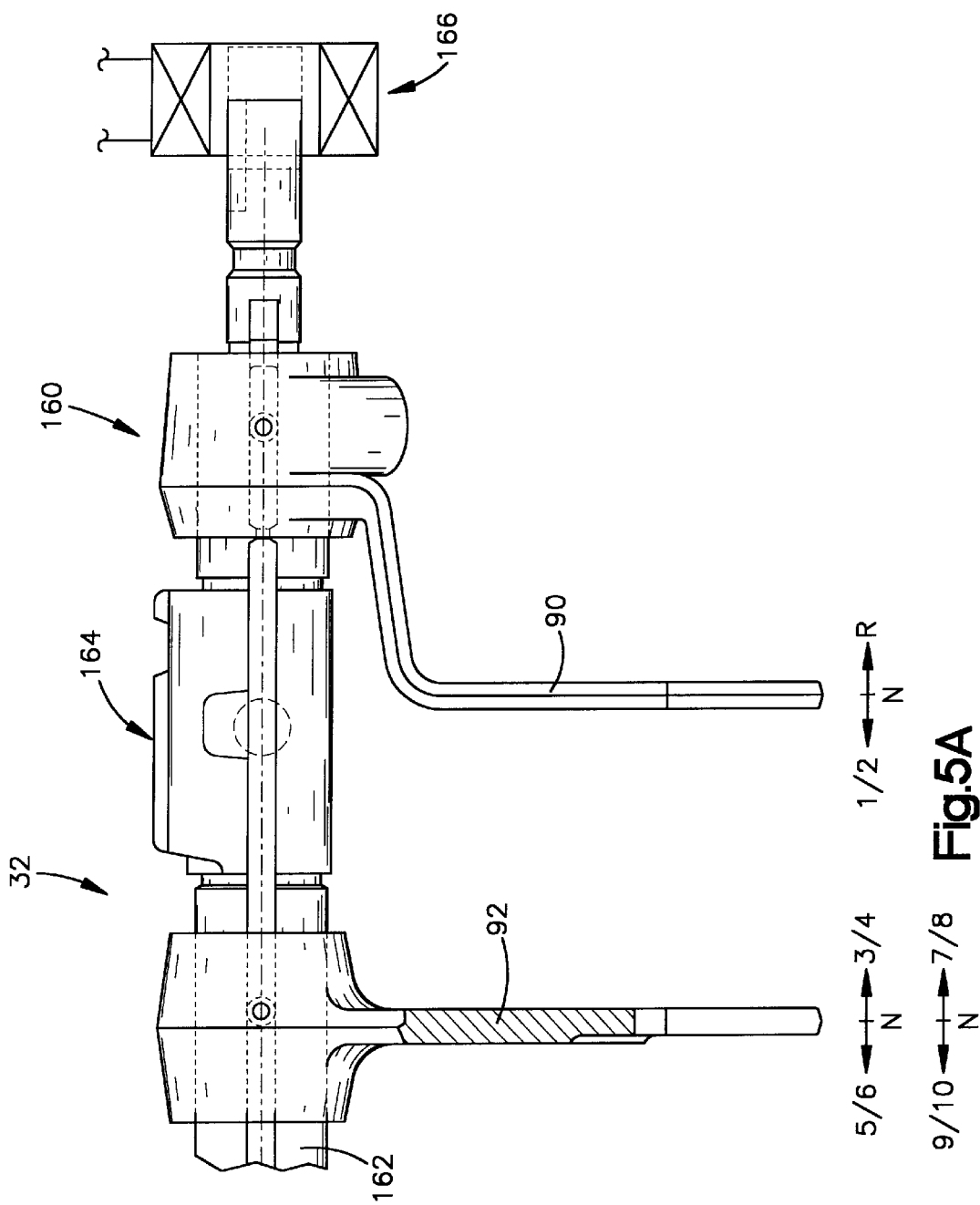

START-FROM-STOP ENGINE TORQUE LIMITING

RELATED APPLICATIONS

This application is an application filed under 35 U.S.C. § 111(a) claiming benefit pursuant to 35 U.S.C. § 119(e)(i) of the filing date of the provisional application 60/071,803, filed Jan. 20, 1998, pursuant to 35 U.S.C. § 111(b).

This application is related to the following co-pending applications, all assigned to EATON CORPORATION, the assignee of this application:

Ser. No. 08/560,458, filed Nov. 17, 1995 and titled ENGINE SHIFT CONTROL

Ser. No. 08/902,603 filed Aug. 7, 1997 and titled PARIALLY AUTOMATED, LEVER-SHIFTED MECHANICAL TRANSMISSION SYSTEM Ser. No. 08/990,678 filed Dec. 15, 1997 and titled ASSISTED LEVER-SHIFTED TRANSMISSION Ser. No. 09/053,089 mailed Apr. 1, 1998 and titled RANGE SHIFT CONTROL Ser. No. 09/053,093 mailed Apr. 1, 1998 and titled ADAPTIVE UPSHIFT JAW CLUTCH ENGAGEMENT CONTROL Ser. No. 09/053,092 mailed Apr. 1, 1998 and titled ENGINE FUEL CONTROL FOR COMPLETING SHIFTS IN CONTROLLER-ASSISTED, MANUALLY SHIFTED TRANSMISSIONS Ser. No. 09/053,095 mailed Apr. 1, 1998 and titled DYNAMIC RANGE SHIFT ACTUATION Ser. No. 09/053,091 mailed Apr. 1, 1998 and titled JAW CLUTCH ENGAGEMENT CONTROL FOR ASSISTED, MANUALLY SHIFTED, SPLITTER-TYPE TRANSMISSION SYSTEM Ser. No. 09/053,090 mailed Apr. 1, 1998 and titled ADAPTIVE NEUTRAL SENSING Ser. No. 09/053,181 mailed Apr. 1, 1998 and titled ADAPTIVE SPLITTER ACTUATOR ENGAGEMENT FORCE CONTROL

BACKGROUND OF THE INVENTION

1. Field of the Invention

The present invention relates to a fully or partially automated vehicular transmission system having an engine controller for controlling engine output torque (i.e., engine flywheel torque) in response to command signals and, in particular, to an automated vehicular transmission system which, if the vehicle transmission is in a relatively high ratio at start-from-stop conditions, limits engine output torque to prevent or limit damage to vehicle power components.

2. Description of the Prior Art

Compound manually shifted mechanical transmissions of the range, splitter and/or combined range/splitter type are in wide use in heavy-duty vehicles and are well known in the prior art, as may be seen by reference to U.S. Pat. Nos. 4,754,665; 5,272,929; 5,370,013 and 5,390,561, 5,546,823; 5,609,062 and 5,642,643, the disclosures of which are incorporated herein by reference. Typically, such transmissions include a main section shifted directly or remotely by a manual shift lever and one or more auxiliary sections connected in series therewith. The auxiliary sections most often were shifted by a slave actuator, usually pneumatically, hydraulically, mechanically and/or electrically operated, in response to manual operation of one or more master switches. Shift controls for such systems by be seen by reference to U.S. Pat. Nos. 4,455,883; 4,550,627; 4,899,607; 4,920,815; 4,974,468; 5,000,060; 5,272,931; 5,281,902; 5,222,404 and 5,350,561, the disclosures of which are incorporated herein by reference.

Fully or partially automated transmission systems wherein a microprocessor-based electronic control unit (ECU) receives input signals indicative of various system operating conditions and processes same according to logic rules to issue command output signals to one or more system actuators are known in the prior art, as may be seen by reference to U.S. Pat. Nos. 4,361,060; 4,593,580; 4,595,986; 4,850,236; 5,435,212; 5,582,069; 5,582,558; 5,620,392; 5,651,292 and 5,679,096; 5,682,790; the disclosures of which are incorporated herein by reference.

Prior art vehicular powertrains having mechanical transmissions where subject to undue wear and/or damage if the driver attempts to launch the vehicle while engaged in a high ratio (i.e., low numerical ratio of input shaft to output shaft speed). While launching the vehicle when engaged in a high ratio can be accomplished by applying high throttle to increase engine speed and output torque while possibly slipping the master clutch, excessive wear and/or damage to the powertrain components could be expected.

SUMMARY OF THE INVENTION

A preferred embodiment of the present invention involves a computer-assisted mechanical compound transmission system wherein the main section is shifted by a manually controlled shift lever and the engine is fueled and/or the auxiliary sections are shifted by actuators at least partially controlled by an ECU to enhance shifting. The ECU uses sensed and/or calculated inputs indicative of system operating parameters, such as operation of a splitter switch and/or a range switch, position and/or rate of change of position of the shift lever, engaged gear ratio, engine speed, output shaft speed, clutch condition and/or throttle pedal position, to assist shifting by controlling engine fueling and/or operation of the range and/or splitter shift actuators.

In accordance with the present invention, the drawbacks of the prior art are minimized or overcome by the provision of a control system/method for a fully or partially automated vehicular transmission system which will sense operating conditions indicative of attempts to launch a vehicle while engaged in a relatively high ratio and, upon sensing such conditions, will cause engine output torque to be limited. This will prevent or minimize excessive wear and/or damage to the vehicle powertrain, will inform the operator that an inappropriate ratio for starting is engaged, and will discourage attempts by the driver to launch the vehicle under such conditions.

Accordingly, it is an object of the present invention to provide ECU assistance for enhanced shifting of a mechanical compound transmission having a main section shifted by a manually operated shift lever.

A further object is to provide a fully or partially automated vehicular mechanical transmission system in which engine output torque is limited at start-from-stop conditions if the transmission is engaged in a non-start ratio to prevent excessive wear and/or damage to the vehicle powertrain.

These and other objects and advantages of the present invention will become apparent from a reading of the following description of the preferred embodiment taken in connection with the attached drawings.

BRIEF DESCRIPTION OF THE DRAWINGS

FIGS. 5A and 5B are schematic illustrations of a shift shaft position sensor mechanism for use in the system of FIG. 1.

DESCRIPTION OF THE PREFERRED EMBODIMENT

Figure 1:
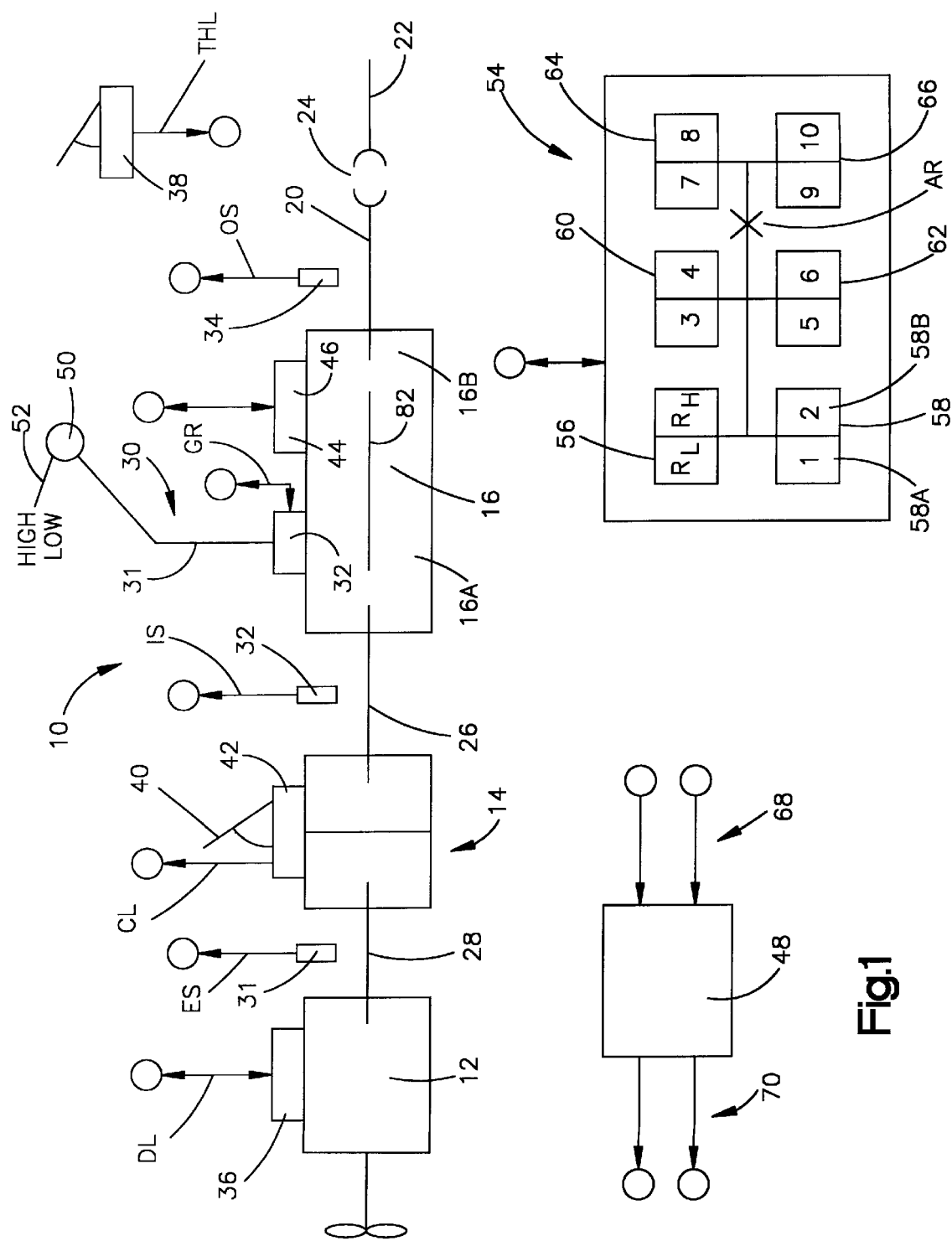
FIG. 1 is a schematic illustration of an ECU-assisted compound mechanical transmission system advantageously utilizing the engine output torque-limiting control of the present invention.

A computer-assisted (i.e., microprocessor-based, controller-assisted) vehicular compound mechanical transmission system 10, particularly well suited to utilize the engine output torque-limiting control of the present invention, may be seen by reference to FIGS. 1–5B.

System 10 is of the type commonly utilized in heavy-duty vehicles, such as the conventional tractors of tractor/semi-trailer vehicles, and includes an engine, typically a diesel engine 12, a master friction clutch 14 contained within a clutch housing, a multiple-speed compound transmission 16, and a drive axle assembly (not shown). The transmission 16 includes an output shaft 20 drivingly coupled to a vehicle drive shaft 22 by a universal joint 24 for driving the drive axle assembly. The transmission 16 is housed within a transmission housing to which is directly mounted the shift tower of the shift lever assembly 30. The present system is equally applicable to remotely mounted shift levers, as are used in cab-over-engine types of vehicles.

Figure 2:
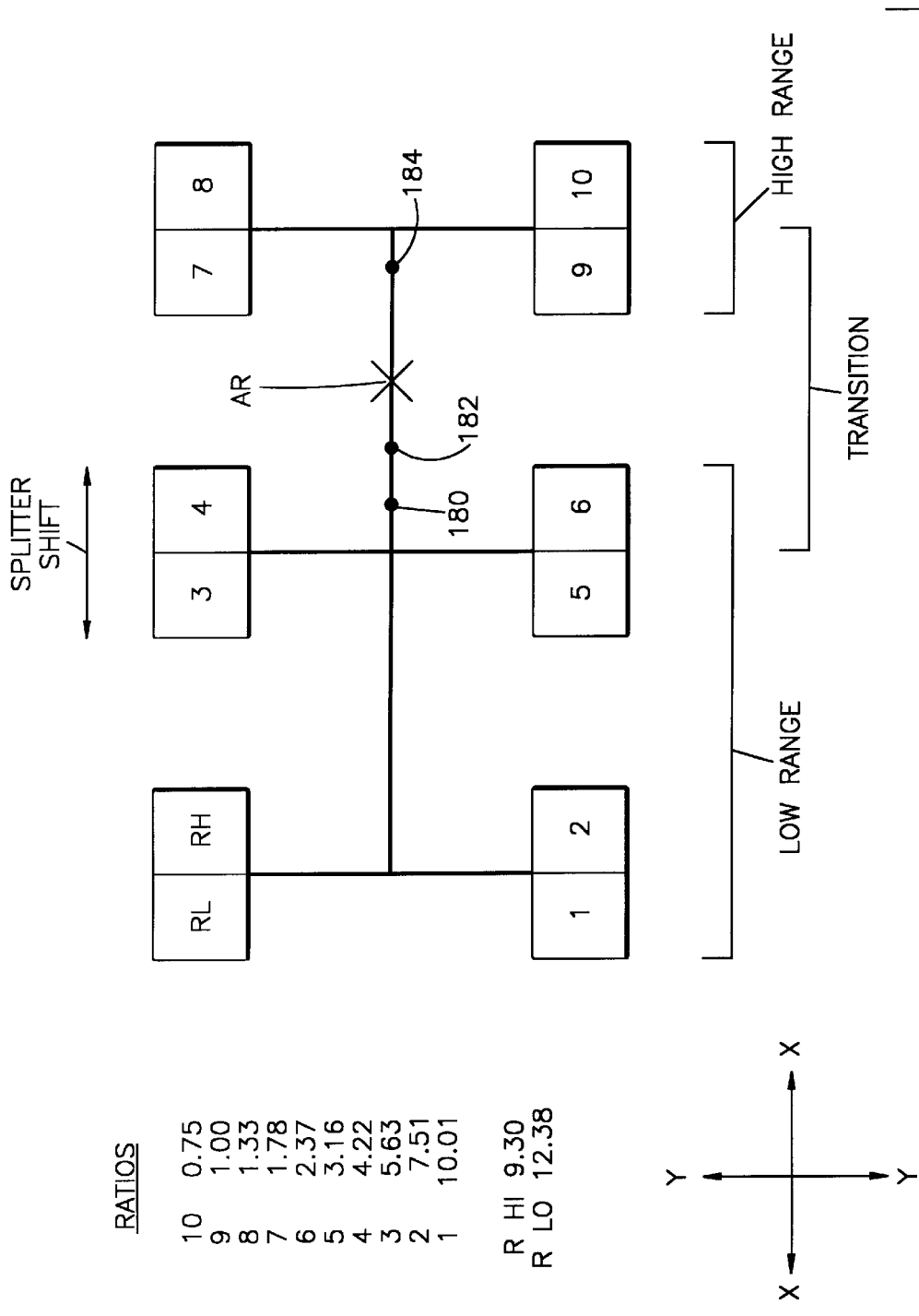
FIG. 2 is a chart illustrating the shift pattern and representative numerical ratios for the transmission of FIG. 1.

FIG. 2 illustrates a shift pattern for assisted manual shifting of a combined range-and-splitter-type compound transmission shifted by a manually operated shift lever. Briefly, the shift lever 31 is movable in the side-to-side or X—X direction to select a particular ratio or ratios to be engaged and is movable in the fore and aft or Y—Y direction to selectively engage and disengage the various ratios. The shift pattern may include an automatic range shifting feature and automatically selected and/or implemented splitter shifting, as is known in the prior art. Manual transmissions utilizing shift mechanisms and shift patterns of this type are well known in the prior art and may be appreciated in greater detail by reference to aforementioned U.S. Pat. Nos. 5,000,060 and 5,390,561.

As is well known in the prior art and as may be seen by reference to U.S. Pat. Nos. 5,416,700; 5,678,453 and 5,385,515, the disclosures of which are incorporated herein by reference, in such transmissions, the first three or four ratios (i.e., first, second, third and/or fourth) usually are considered acceptable start ratios, while the remaining ratios are not. Unacceptable or inappropriate start ratios are those transmission ratios in which a vehicle launch is likely to cause undue wear and/or damage to the vehicle driveline.

Typically, the shift lever assembly 30 will include a shift finger or the like (not shown) extending downwardly into a shifting mechanism 32, such as a multiple-rail shift bar housing assembly or a single shift shaft assembly, as is well known in the prior art and as is illustrated in aforementioned U.S. Pat. Nos. 4,455,883; 4,550,627; 4,920,815 and 5,272,931.

In the automatic range shifting feature, as the shift lever moves in the transition area between the middle leg ($\frac{3}{4}$–$\frac{5}{6}$) and the righthand leg ($\frac{7}{8}$–$\frac{9}{10}$) of the shift pattern, it will cross a point, AR, which will actuate a mechanical or electrical range switch, or will be sensed by a position sensor, to cause automatic implementation of a range shift.

Shifting of transmission 16, comprising main section 16A coupled in series to auxiliary section 16B, is semi-automatically implemented/assisted by the vehicular transmission system 10, illustrated in FIGS. 1–5B. Main section 16A includes an input shaft 26, which is operatively coupled to the drive or crank shaft 28 of the vehicle engine 12 by master clutch 14, and output shaft 20 of auxiliary section 16B is operatively coupled, commonly by means of a drive shaft 24, to the drive wheels of the vehicle. The auxiliary section 16B is a splitter type, preferably a combined range-and-splitter type, as illustrated in U.S. Pat. Nos. 4,754,665 and 5,390,561.

The change-gear ratios available from main transmission section 16 are manually selectable by manually positioning the shift lever 31 according to the shift pattern prescribed to engage the particular desired change gear ratio of main section 16A.

The system may include sensors 30 (for sensing engine rotational speed (ES)), 32 (for sensing input shaft rotational speed (IS)), and 34 (for sensing output shaft rotational speed (OS)), and providing signals indicative thereof. As is known, with the clutch 14 (i.e., no slip) engaged and the transmission engaged in a known gear ratio, ES=IS=OS*GR (see U.S. Pat. No. 4,361,060). Accordingly, if clutch 14 is engaged, engine speed and input shaft speed may be considered as equal.

Engine 12 is electronically controlled, including an electronic controller 36 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle position sensor 38 may be provided or throttle position (THL) may be sensed from the data link. Gross engine torque (TEG) and base engine friction torque (TSEF) also are available on the data link.

As is well known in the prior art and as may be seen by reference to U.S. Pat. No. 5,509,867 and allowed co-pending U.S. Ser. No. 08/560,458, electronically controlled engines, such as diesel engines, may be controlled such that engine torque is limited to a selected value. While output torque or flywheel torque is the desirable parameter to control, a related value (such as the value "actual—engine—percent—torque," as defined in SAE J-1939) may be the control parameter (see U.S. Pat. No. 5,582,069 and 5,509,867).

A manual clutch pedal 40 controls the master clutch 14, and a sensor 42 provides a signal (CL) indicative of clutch-engaged or -disengaged condition. The condition of the clutch also may be determined by comparing engine speed to input shaft speed if both signals are available. An auxiliary section actuator 44 including a range shift actuator and a splitter actuator 46 is provided for operating the range clutch and the splitter section clutch in accordance with command output signals from ECU 48. The shift lever 31 has a knob 50 which contains splitter selector switch 52 by which a driver's intent to initiate a splitter shift may be sensed.

System 10 may include a driver's display unit 54 including a graphic representation of the six-position shift pattern with individually lightable display elements 56, 58, 60, 62, 64 and 66, representing each of the selectable engagement positions. Preferably, each half of the shift pattern display elements (i.e., 58A and 58B) will be individually lightable, allowing the display to inform the driver of the lever and splitter position for the engaged ratio.

The system includes a control unit or ECU 48, preferably a microprocessor-based control unit of the type illustrated in U.S. Pat. Nos. 4,595,986; 4,361,065 and 5,335,566, the disclosures of which are incorporated herein by reference, for receiving input signals 68 and processing same according to predetermined logic rules to issue command output signals 70 to system actuators, such as the splitter section actuator 46, the engine controller 36, the range shift actuator and/or the display unit 54. A separate system controller may be utilized, or the engine controller ECU 36 communicating over an electronic data link may be utilized.

As shown in U.S. Pat. No. 5,651,292 (the disclosure of which is ncorporated herein by reference) and co-pending patent application U.S. Ser. No. 08/597,304 (assigned to the assignee of this application), the splitter actuator 46 is, preferably, a three-position device, allowing a selectable and maintainable splitter section neutral. Alternatively, a "pseudo" splitter-neutral may be provided by deenergizing the splitter actuator when the splitter clutch is in an intermediate, non-engaged position.

Figure 3:
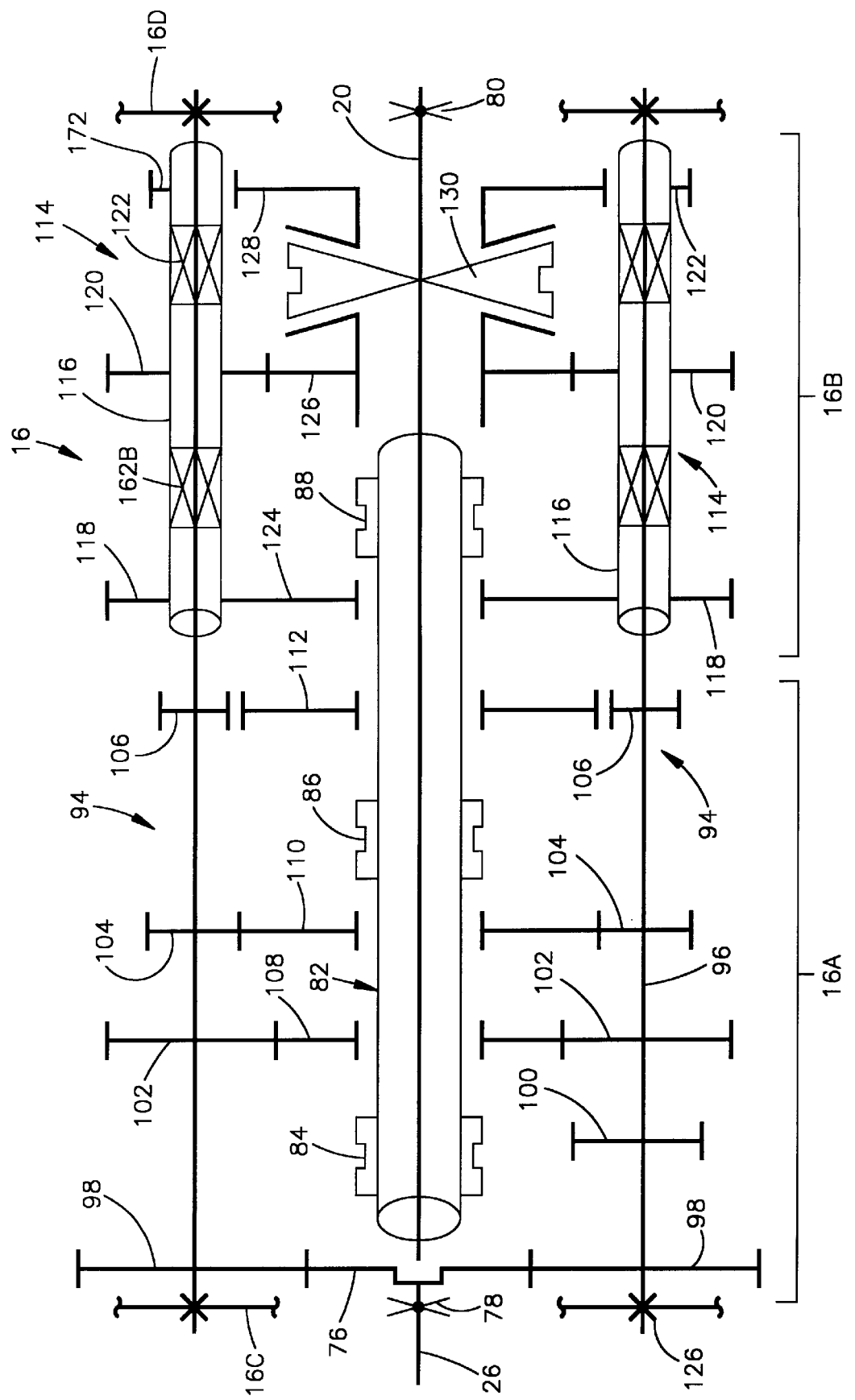
FIG. 3 is a schematic illustration of the structure of the compound mechanical transmission of FIG. 1.

The structure of the 10-forward-speed combined range-and-splitter-type transmission 16 is schematically illustrated in FIG. 3. Transmissions of this general type are disclosed in aforementioned U.S. Pat. Nos. 5,000,060; 5,370,013 and 5,390,561.

Transmission 16 includes a main section 16A and an auxiliary section 16B, both contained within a housing including a forward end wall 16C, which may be defined by the clutch housing, and a rearward end wall 16D, but (in this particular embodiment) not an intermediate wall.

Input shaft 26 carries input gear 76 fixed for rotation therewith and defines a rearwardly opening pocket wherein a reduced diameter extension of output shaft 20 is piloted. A non-friction bushing or the like may be provided in the pocket or blind bore. The rearward end of input shaft 26 is supported by bearing 78 in front end wall 16C, while the rearward end of output shaft 20 is supported by bearing assembly 80 in rear end wall 16D.

The mainshaft 82, which carries mainshaft clutches 84 and 86, and the mainshaft splitter clutch 88 is in the form of a generally tubular body having an externally splined outer surface and an axially extending through bore for passage of output shaft 20. Shift forks 90 and 92 are provided for shifting clutches 84 and 86, respectively (see FIG. 5A). Mainshaft 82 is independently rotatable relative to input shaft 26 and output shaft 20 and preferably is free for limited radial movement relative thereto.

The main section 16A includes two substantially identical main section countershaft assemblies 94, each comprising a main section countershaft 96 carrying countershaft gears 98, 100, 102, 104 and 106 fixed thereto. Gear pairs 98, 100, 102, 104 and 106 are constantly meshed with input gear 76, mainshaft gears 108 and 110 and an idler gear (not shown), which is meshed with reverse mainshaft gear 112, respectively.

Main section countershaft 96 extends rearwardly into the auxiliary section, where its rearward end is supported directly or indirectly in rear housing end wall 16D.

The auxiliary section 16B of transmission 16 includes two substantially identical auxiliary countershaft assemblies 114, each including an auxiliary countershaft 116 carrying auxiliary countershaft gears 118, 120 and 122 for rotation therewith. Auxiliary countershaft gear pairs 118, 120 and 122 are constantly meshed with splitter gear 124, splitter/range gear 126 and range gear 128, respectively. Splitter clutch 88 is fixed to mainshaft 82 for selectively clutching either gear 124 or 126 thereto, while synchronized range clutch 130 is fixed to output shaft 20 for selectively clutching either gear 126 or gear 128 thereto.

Auxiliary countershafts 116 are generally tubular in shape, defining a through bore for receipt of the rearward extensions of the main section countershafts 96. Bearings or bushings are provided to rotatably support auxiliary countershaft 116 on main section countershaft 96.

The splitter jaw clutch 88 is a double-sided, non-synchronized clutch assembly which may be selectively positioned in the rightwardmost or leftwardmost positions for engaging either gear 126 or gear 124, respectively, to the mainshaft 82 or to an intermediate position wherein neither gear 124 or 126 is clutched to the main shaft. Splitter jaw clutch 88 is axially positioned by means of a shift fork 98 controlled by a three-position actuator, such as a piston actuator, which is responsive to a driver selection switch, such as a button or the like on the shift knob, as is known in the prior art, and to control signals from ECU 48 (see U.S. Pat. No. 5,661,998). Two-position synchronized range clutch assembly 130 is a two-position clutch which may be selectively positioned in either the rightwardmost or leftwardmost positions thereof for selectively clutching either gear 128 or 126, respectively, to output shaft 20. Clutch assembly 130 is positioned by means of a shift fork (not shown) operated by means of a two-position piston device. Either piston actuator may be replaced by a functionally equivalent actuator, such as a ball screw mechanism, ball ramp mechanism or the like.

By selectively axially positioning both the splitter clutch 88 and the range clutch 130 in the forward and rearward axial positions thereof, four distinct ratios of mainshaft rotation to output shaft rotation may be provided. Accordingly, auxiliary transmission section 16B is a three-layer auxiliary section of the combined range and splitter type providing four selectable speeds or drive ratios between the input (mainshaft 82) and output (output shaft 20) thereof. The main section 16A provides a reverse and three potentially selectable forward speeds. However, one of the selectable main section forward gear ratios, the low-speed gear ratios associated with mainshaft gear 110, is not utilized in the high range. Thus, transmission 16 is properly designated as a "(2+1)×(2×2)" type transmission providing nine or ten selectable forward speeds, depending upon the desirability and practicality of splitting the low gear ratio.

Splitter shifting of transmission 16 is accomplished responsive to initiation by a vehicle operator-actuated splitter button 52 or the like, usually a button located at the shift lever knob, while operation of the range clutch shifting assembly is an automatic response to movement of the gear shift lever between the central and rightwardmost legs of the shift pattern, as illustrated in FIG. 2. Alternatively, splitter shifting may be automated (see U.S. Pat. No. 5,435,212). Range shift devices of this general type are known in the prior art and may be seen by reference to aforementioned U.S. Pat. Nos. 3,429,202; 4,455,883; 4,561,325 and 4,663,725.

Although the present invention is illustrated in the embodiment of a compound transmission not having an intermediate wall, the present invention is equally applicable to transmissions of the type illustrated in aforementioned U.S. Pat. Nos. 4,754,665; 5,193,410 and 5,368,145.

The position of the shift lever 31 or of the shifting mechanism 32 controlled thereby may be sensed by a position sensor device. Various positioning sensing assemblies are known in the prior art, with a preferred type illustrated in allowed U.S. Ser. No. 08/695,052, assigned to the assignee of this application, the disclosure of which is incorporated herein by reference. Sensors of this type will provide a signal indicative of the actual engaged ratio, or at least if the transmission is in the high- or the low-range position.

Figure 5B:
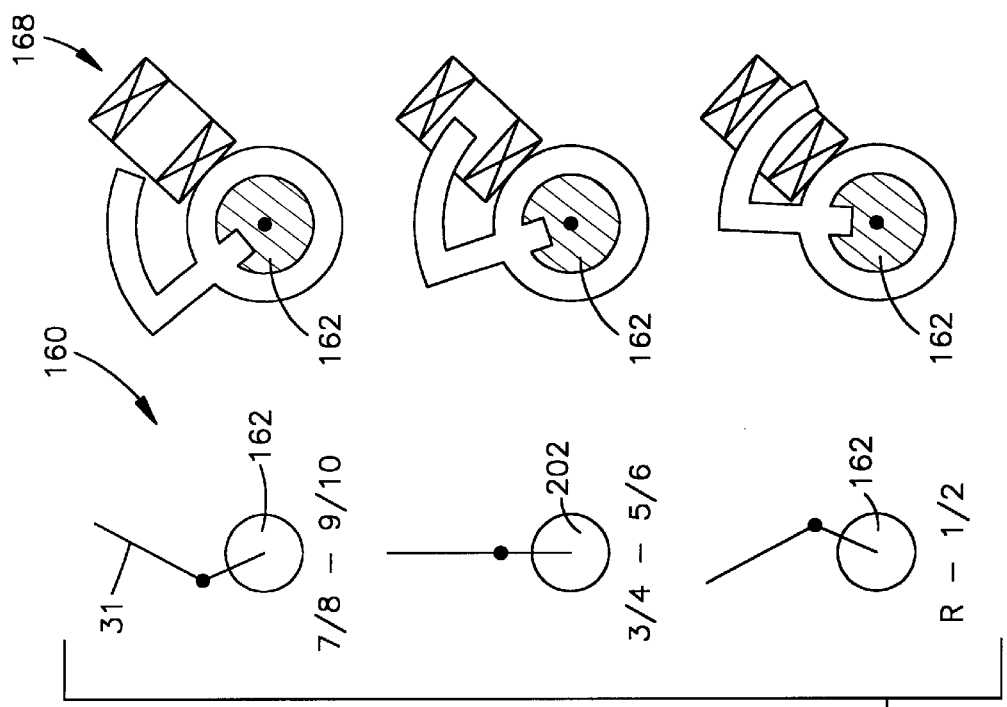
Figure 4:
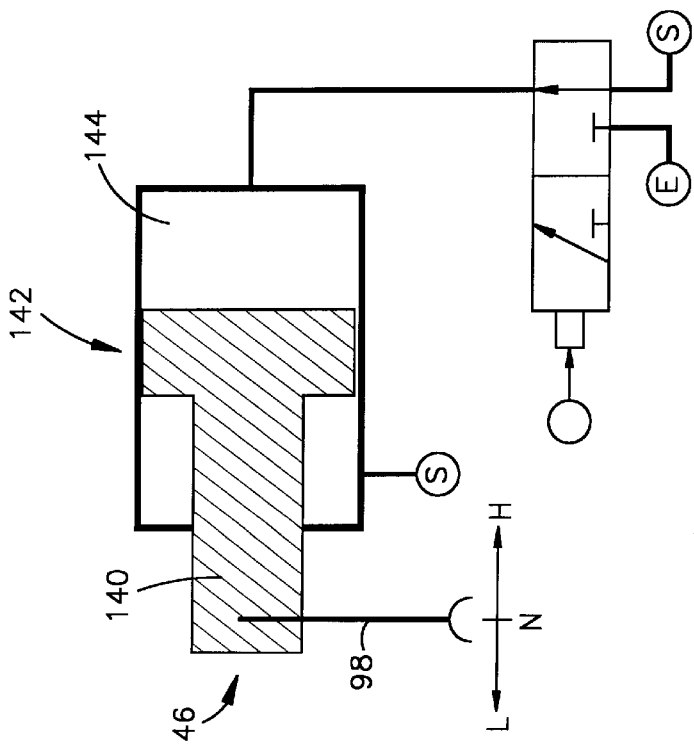
FIG. 4 is a schematic illustration of a three-position splitter actuator for use with the transmission system of FIG. 1.
Figure 6:
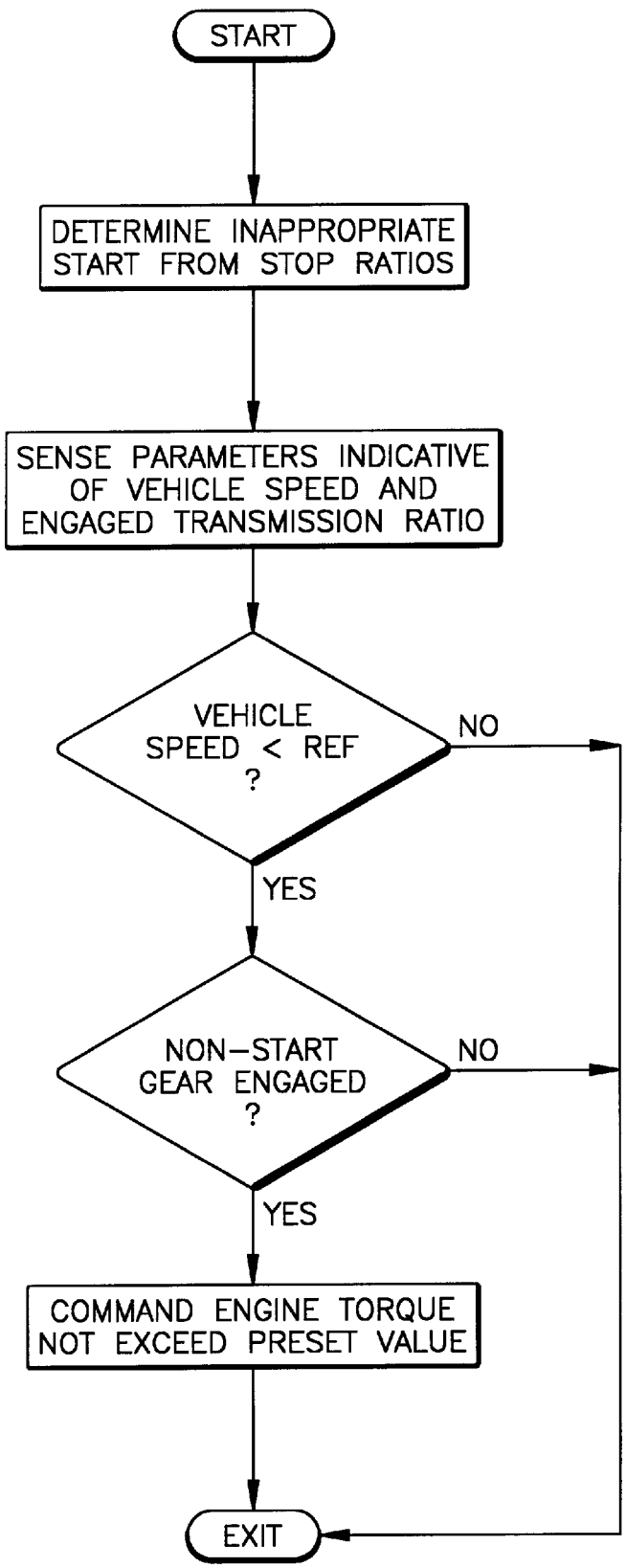
FIG. 6 is a flow chart representation of the present invention.

Referring to FIGS. 5A and 5B, shifting mechanism 32 is illustrated as a single shift shaft device 160 having a shaft 162 which is rotatable in response to X—X movements of shift lever 31 and axially movable in response to Y—Y movements of shift lever 31. Mechanisms of this type are described in detail in aforementioned U.S. Pat. No. 4,920, 815.

Shift shaft 162 carries the main section shift forks 90 and 92 for selective axial movement therewith and a shift block member 164 for receiving a shift finger or the like. A pair of coils 166 and 168 provide a pair of signals (collectively GR) indicative of the axial and rotational position of shaft 162 and, thus, of shift lever 31 relative to the shift pattern illustrated in FIG. 2. Preferably, the rate of change of position (dGR/dt) also may be determined and utilized to enhance shifting of the system 10.

By way of example, referring to FIG. 2, if shift lever position can be sensed, the need for a fixed switch or the like at point AR to sense a required initiation of a shift between low range and high range is eliminated. Further, as physical switches are no longer required, the shift pattern position at which a range shift will be commanded can be varied, such as to points 180, 182 or 184, to enhance system performance under various operating conditions.

If in first (1st) through fourth (4th), a shift into high range is unlikely and the auto range shift initiation point may be moved to position 184 (away from the expected shift lever path) to prevent inadvertent actuation of a range shift. If in sixth (6th) with a high engine speed, a shift into high range is likely and moving the auto range initiation point to position 180 will allow for a quicker initiation of a range shift.

According to the present invention, the operator is allowed to control engine fueling unless the current vehicle operating conditions indicate that his/her operation of the throttle pedal will not allow the jaw clutches associated with the current target ratio to engage. If operating conditions, including operator setting of the throttle pedal, indicate that the operator will complete a splitter shift into target ratio, the engine will be fueled in accordance with operator throttle setting. If not, automatic engine fueling may occur. If the splitter section does engage prior to the main section, as is preferred, the operator will remain in complete control of engine fueling to complete the shift by engaging the main section.

The state of engagement (i.e., engaged or neutral) of the main transmission section 16A is an important control parameter for system 10. By way of example, if main section neutral is sensed, the splitter may be commanded to a full force engagement, regardless of the existence or absence of synchronous conditions. Also, if the main section is engaged while the splitter is in neutral, the system will not cause splitter engagement until substantial synchronous is sensed and may then initiate automatic fuel control if required. Of course, it is important to prevent or minimize false determinations of main section neutral and/or engaged conditions.

Referring to FIG. 2, a first narrow band 202 and a second wider band 204 of vertical displacements from the bight portion 200 are utilized to determine if the main section is or is not in neutral. If the transmission main section is not confirmed as being in main section neutral, the neutral confirmation band will be the narrower band 202. This will assure that the main section 16A is truly in neutral before declaring a main section neutral condition. If the transmission main section 16A is confirmed as being in neutral, the neutral confirmation band will be the wider band 204. This assures that mere overshooting of neutral or raking of main section jaw clutches will not be incorrectly interpreted as a main section engaged condition.

Sensing the shift lever at point 206 will always be interpreted as main section neutral, and sensing the shift lever at point 208 will always be interpreted as main section engaged. However, if the shift lever is sensed at point 210, this will not cause a previous determination of a neutral or engaged condition to change.

Vehicle operating conditions other than or in addition to currently engaged or neutral condition of the main section 1 6A may be used to vary the width of the neutral sensing bands.

According to the control method/system of the present invention, if the operator attempts to launch the vehicle while the transmission is engaged in an inappropriate start ratio, such as in seventh, eighth, ninth or tenth, the controller 48 will cause the engine controller 36 to fuel the engine to limit maximum output torque to a determined value. The value may vary with the particular ratio or may be fixed for all inappropriate ratios. By way of example, torque may be limited to 30% or 40% of maximum output torque.

This will minimize undue wear and/or damage to the vehicle powertrain, will discourage attempts to launch a vehicle under such conditions, and will inform the operator that an inappropriate start ratio has been selected.

In a relatively simple system, the torque-limiting feature may be initiated at relatively low vehicle speeds (i.e., output shaft speed less than about 80 RPM) when the transmission is in high range, as sensed by the AR-sensing mechanism or a range switch or range selector. Alternatively, the particular ratio engaged may be sensed by the lever position sensors 166 and 168, and the engine output torque may be limited to a value which is fixed or which varies with sensed engaged ratio. In a further embodiment, vehicle gross weight may be determined or estimated (see U.S. Pat. Nos. 5,487,005 and 5,490,063, the disclosures of which are incorporated herein by reference) and the appropriateness of the start ratios may be determined as a function of vehicle weight.

Accordingly, it may be seen that a new and improved control system/method is provided, which provides an automated transmission system which will minimize or prevent powertrain damage due to attempts to launch the vehicle while engaged in an inappropriate start ratio.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A computer program product for controlling a vehicular transmission system comprising a multiple-speed transmission driven by a fuel-controlled engine having a maximum output torque, said transmission having a plurality of acceptable start ratios and a plurality of unacceptable start ratios, a manually operated shift selector for shifting said transmission in accordance with an established shift pattern, an engine controller for controlling fueling of said engine in response to command signals, said engine controller having a mode of operation effective to limit engine output torque, a system controller for receiving input signals and processing same according to predetermined logic rules to determine values of control parameters indicative of vehicle operating conditions, including vehicle speed and engaged transmision ratio, and to issue command output signals to system actuators, including said engine controller, said program having codes for:

determining as a function of the values of said control parameters indicative of vehicle operating conditions if said transmission is engaged in an unacceptable start ratio when vehicle speed is below a predetermined speed value; and if said transmission is engaged in an unacceptable start ratio when vehicle speed is less than said predetermined speed value, issuing command output signals to said engine controller to limit engine output torque to a predetermined engine torque value.

2. The computer program product of claim 1 wherein said predetermined engine torque value is less than 50% of the maximum output torque of said engine.

3. The computer program product of claim 1 wherein said predetermined speed value is no greater than 2 MPH.

4. The computer program product of claim 1 wherein said input signals include signals indicative of engine rotational speed and transmission output shaft rotational speed.

5. The computer program product of claim 1 wherein said transmission is a compound transmission having a main transmission section shifted by said manually operated shift selector and a two-speed range section having a high-range ratio and a low-range ratio connected in series therewith, said acceptable start ratios defined by said range section engaged in said low-range ratio and said unacceptable start ratios defined by said range section engaged in said high-range ratio, said input signals including a signal indicative of the engaged range ratio of said range section.

6. The computer program product of claim 1 wherein said shift selector is a manually operated shift lever.

7. A method for controlling a vehicular powertrain system (10) comprising a fuel-controlled engine (12) drivingly connected to a vehicular drivetrain system including a multiple-ratio, change-gear transmission (16), said engine having a maximum output torque, and an engine controller (36) responsive to command signals to control fueling of the engine and, in at least one mode of operation, effective to limit engine output torque, said method comprising:

determining values of control parameters indicative of drivetrain operating conditions including vehicle speed and engaged transmission ratio;

comparing the values of said control parameters to reference values corresponding to the value of said control parameters during drivetrain operating conditions wherein the vehicle is being launched from a substantially stopped condition and said transmission is engaged in a ratio deemed inappropriate for launching said vehicle from a substantially stopped condition; and if the sensed values of said control parameters are indicative of the existence of an attempt to launch said vehicle while said transmission is engaged in an inapproriate ratio, causing said engine controller to limit engine output torque to a value less than 50% of maximum engine output torque.

8. The method of claim 7 wherein said transmission is a compound transmission including a two-speed range section having a highspeed range ratio and a low-speed range ratio, said control parameter indicative of engagement of said transmission in an inappropriate ratio for launching said vehicle from a substantially stopped condition comprising sensing engagement of said range section in the high-speed range ratio thereof.

9. A method for controlling a vehicular transmission system comprising a multiple-speed transmission driven by a fuel-controlled engine having a maximum output torque, said transmission having a plurality of acceptable start ratios and a plurality of unacceptable start ratios, a manually operated shift selector, an engine controller for controlling fueling of said engine in response to command signals, said engine controller having a mode of operation effective to limit engine output torque, a system controller for receiving input signals and processing same according to predetermined logic rules to determine values of control parameters indicative of vehicle operating conditions, including vehicle speed and engaged transmision ratio, and to issue command output signals to system actuators, including said engine controller, said method comprising:

determining as a function of the values of said control parameters indicative of vehicle operating conditions if said transmission is engaged in an unacceptable start ratio when vehicle speed is below a predetermined speed value; and if said transmission is engaged in an unacceptable start ratio when vehicle speed is less than said predetermined speed value, issuing command output signals to said engine controller to limit engine output torque to a predetermined engine torque value.

10. The method of claim 9 wherein said predetermined engine torque value is less than 50% of the maximum output torque of said engine.

11. The method of claim 9 wherein said predetermined speed value is no greater than 2 MPH.

12. The method of claim 9 wherein said input signals include signals indicative of engine rotational speed and transmission output shaft rotational speed.

13. The method of claim 9 wherein said transmission is a compound transmission having a main transmission section and a two-speed range section having a high-range ratio and a low-range ratio connected in series therewith, said acceptable start ratios defined by said range section engaged in said low-range ratio and said unacceptable start ratios defined by said range section engaged in said high-range ratio, said input signals including a signal indicative of the engaged range ratio of said range section.

14. The method of claim 9 wherein said shift selector is movable in an established shift pattern for shifting said transmission.

15. A control system for controlling a vehicular transmission system comprising a multiple-speed transmission driven by a fuel-controlled engine having a maximum output torque, said transmission having a plurality of acceptable start ratios and a plurality of unacceptable start ratios, a manually operated shift selector, an engine controller for controlling fueling of said engine in response to command signals, said engine controller having a mode of operation effective to limit engine output torque, a system controller for receiving input signals and processing same according to predetermined logic rules to determine values of control parameters indicative of vehicle operating conditions, including vehicle speed and engaged transmission ratio, and to issue command output signals to system actuators, including said engine controller, said control system comprising:

means for determining as a function of the values of said control parameters indicative of vehicle operating conditions if said transmission is engaged in an unacceptable start ratio when vehicle speed is below a predetermined speed value; and means effective, if said transmission is engaged in an unacceptable start ratio when vehicle speed is less than said predetermined speed value, for issuing command output signals to said engine controller to limit engine output torque to a predetermined engine torque value.

16. The control system of claim 15 wherein said predetermined engine torque value is less than 50% of the maximum output torque of said engine.

17. The control system of claim 15 wherein said predetermined speed value is no greater than 2 MPH.

18. The control system of claim 15 wherein said input signals include signals indicative of engine rotational speed and transmission output shaft rotational speed.

19. The control system of claim 15 wherein said transmission is a compound transmission having a main transmission section and a range section having a high-range ratio and a low-range ratio connected in series therewith, said acceptable start ratios defined by said range section engaged in said low-range ratio and said unacceptable start ratios defined by said range section engaged in a range ratio other than said low-range ratio, said input signals including a signal indicative of the engaged range ratio of said range section.

20. The system of claim 15 wherein said shift selector is movable in an established shift pattern for shifting said transmission.

21. A method for controlling a vehicular powertrain system (10) comprising a fuel-controlled engine (12) drivingly connected to a vehicular drivetrain system including a multiple-ratio, change-gear transmission (16), said engine having a maximum output torque, and an engine controller (36) responsive to command signals to control fueling of the engine and, in at least one mode of operation, effective to limit engine output torque, said method comprising:

determining values of control parameters indicative of drivetrain operating conditions including vehicle speed and engaged transmission ratio;

comparing the values of said control parameters to reference values corresponding to the value of said control parameters during drivetrain operating conditions wherein the vehicle is being launched from a substantially stopped condition and said transmission is engaged in a ratio deemed inappropriate for launching said vehicle from a substantially stopped condition; and if the sensed values of said control parameters are indicative of the existence of an attempt to launch said vehicle while said transmission is engaged in an inapproriate ratio, causing said engine controller to limit engine output torque to a value less than said maximum engine output torque.

* * * * *